US007227461B2

(12) United States Patent
Choi et al.

(10) Patent No.: US 7,227,461 B2
(45) Date of Patent: Jun. 5, 2007

(54) SECURITY CONFIRMATION SYSTEM AND METHOD THEREOF

(75) Inventors: Hwan-Jong Choi, Busan (KR); Feel-Young Koo, Busan (KR); Ja-In Koo, Jinju-Shi (KR); Koon-Seok Lee, Changwon-Shi (KR); Seung-Myun Baek, Changwon-Shi (KR); Yong-Tae Kim, Gimhae-Shi (KR); Sung-Hwan Kang, Kyungsangnam-Do (KR)

(73) Assignee: LG Electronics, Inc., Seoul (KR)

( * ) Notice: Subject to any disclaimer, the term of this patent is extended or adjusted under 35 U.S.C. 154(b) by 91 days.

(21) Appl. No.: 10/848,573

(22) Filed: May 19, 2004

(65) Prior Publication Data

US 2005/0156733 A1 Jul. 21, 2005

(30) Foreign Application Priority Data

Jan. 19, 2004 (KR) ...................... 10-2004-0003862

(51) Int. Cl.
*G05B 23/02* (2006.01)
*G05B 11/01* (2006.01)
*G05B 15/00* (2006.01)
*G08B 29/00* (2006.01)
*G08B 1/08* (2006.01)

(52) U.S. Cl. ...................... 340/531; 340/3.1; 340/3.43; 340/3.44; 340/500; 340/506; 340/517; 340/539.1; 700/11; 700/17; 700/83

(58) Field of Classification Search ................ 340/531, 340/500, 506, 517, 525, 539.11, 539.14, 539.16, 340/3.1, 3.43, 3.44; 700/83, 11, 17; 702/188
See application file for complete search history.

(56) References Cited

U.S. PATENT DOCUMENTS

| | | | | |
|---|---|---|---|---|
| 5,629,687 | A * | 5/1997 | Sutton et al. | 340/825.37 |
| 6,553,336 | B1 * | 4/2003 | Johnson et al. | 702/188 |
| 6,580,950 | B1 * | 6/2003 | Johnson et al. | 700/17 |
| 6,924,727 | B2 * | 8/2005 | Nagaoka et al. | 340/3.1 |

FOREIGN PATENT DOCUMENTS

| | | |
|---|---|---|
| KR | 2001-0084084 | 9/2001 |
| KR | 2001-0111066 | 12/2001 |

* cited by examiner

*Primary Examiner*—Daniel Wu
*Assistant Examiner*—Lam Pham
(74) *Attorney, Agent, or Firm*—McKenna Long & Aldridge LLP.

(57) ABSTRACT

The present invention discloses a security confirmation system which can achieve efficient communication by optimizing an amount of transmitted data, and a method thereof. The security confirmation system includes a home master device connected to at least one security device through a first network based on a predetermined protocol, for receiving predetermined security information from the security device, generating a service security data having the security information, and transmitting the service security data, and a user terminal connected to the home master device through a second network separated from the first network, for receiving and displaying the service security data.

11 Claims, 4 Drawing Sheets

FIG.5

| SECURITY DEVICE | POSITION | STATUS | OPERATION | EXAMINATION TIME | EXAMINATION INTERVAL |
|---|---|---|---|---|---|
| CAMERA 1 | FRONT DOOR | IMAGE VIEW | PHOTOGRAPH CHANGE | NOT DESIGNATED | NOT DESIGNATED |
| CAMERA 2 | LIVING ROOM | IMAGE VIEW | PHOTOGRAPH CHANGE | 1P.M.~4P.M. | 5 MINUTES |
| LOCK 1 | FRONT DOOR | CLOSE | LOCK CHANGE | NOT DESIGNATED | NOT DESIGNATED |
| LOCK 2 | LIVING ROOM WINDOW | CLOSE | LOCK CHANGE | NOT DESIGNATED | NOT DESIGNATED |
| GAS VALVE | KITCHEN | CLOSE | LOCK CHANGE | NOT DESIGNATED | NOT DESIGNATED |

SECURITY CONFIRMATION SYSTEM AND METHOD THEREOF

This application claims priority from Korean Patent Application No. 10-2004-0003862 filed Jan. 19, 2004, which is hereby incorporated by reference as if fully set forth herein.

1. Technical Field

The present invention relates to a security confirmation system and a method thereof, and more particularly to, a security confirmation system which can achieve efficient communication by optimizing an amount of transmitted data, and a method thereof.

2. Background Art

In general, a home automation system provides various kinds of convenient functions to each household of apartments, houses and offices, such as automatic open/close functions for the entrance, remote control functions for various electric home appliances in each household, and monitoring and alarming functions for emergencies such as fire or trespass.

Recently, the home automation system provides more various functions on the basis of an internet due to development of data communication technologies. One of the examples is a home network system.

When a member of a household goes out, the home network system allows the member to access an internet network through a computer terminal or internet phone, confirm the status of various electric home appliances, for example, TV, computer terminal, gas valve, electric lamp, air conditioner and washing machine, and turn on/off the electric home appliances.

FIG. 1 is a block diagram illustrating a conventional security confirmation system. Referring to FIG. 1, the security confirmation system 10 includes a camera 1 fixedly installed in a predetermined device or space of a house, for generating an image data for obtaining an image, a computer 2 installed in the house, for receiving the image data from the camera 1, and transmitting the image data through an internet 3, the internet 3 which the image data is transmitted through, and a user terminal 4 for receiving the image data and displaying the image data to the user.

When the user terminal 4 is a computer, the security confirmation system 10 includes a Web server (not shown) between the internet 3 and the user terminal 4, and when the user terminal 4 is an internet phone, the security confirmation system 10 includes a Wap server (not shown) therebetween.

Here, the user terminal 4 obtains the image data including the image continuously or intermittently photographed by the camera 1 from the computer 2, and displays the image data to the user. Therefore, the user receives the image in the house, but does not obtain other information. In addition, in the case that the user receives the image data through the internet 3, the image data has a size of at least a few to a few tens of megabytes, which increases a transmission time and cost. As a result, the user is not able to often access the internet 3 to confirm the home environment.

DISCLOSURE OF THE INVENTION

The present invention is achieved to solve the above problems. An object of the present invention is to provide a security confirmation system which can supply service security data including images in a house and/or building as well as security status texts of security devices, and a method thereof.

Another object of the present invention is to provide a security confirmation system which can control security devices by using previously-transmitted service security data, and a method thereof.

Yet another object of the present invention is to provide a security confirmation system which can reduce an amount and cost of transmitted data, by basically using service security data based on texts and additionally using image data, and a method thereof.

Yet another object of the present invention is to provide a security confirmation system which can obtain image data in a few spaces of a house and/or building by using mobile security devices, and a method thereof.

In order to achieve the above-described objects of the invention, there is provided a security confirmation system including: a home master device connected to at least one security device through a first network based on a predetermined protocol, for receiving predetermined security information from the security device, generating a service security data having the security information, and transmitting the service security data; and a user terminal connected to the home master device through a second network separated from the first network, for receiving and displaying the service security data.

Preferably, the service security data includes a name and installation position of the security device corresponding to the security information.

Preferably, the user terminal generates a service control data having a control command for the security device inputted by the user, and transmits the service control data to the home master device, and the home master device receives the service control data, reads the control command from the service control data, and transmits the control command to the corresponding security device to control the device.

Preferably, the user terminal displays the service security data in the form of a service table which the user can input the control command into.

Preferably, the service security data includes a preset control command for the security device.

Preferably, the control command includes an operation and an examination time and/or interval for the security device.

Preferably, the security device includes at least one of a locking device, a valve device, an action sensor and a photographing device.

Preferably, the security information includes at least one of status information for the security device and image information generated by the security device.

Preferably, the photographing device has mobility.

According to another aspect of the invention, a security confirmation system includes: a home network system including at least one security device for generating predetermined security information, and a home master device connected to the security device through a first network based on a predetermined protocol, for receiving the security information, generating a service security data having the security information, and transmitting the service security data; a second network system including a predetermined server corresponding to a kind of a user terminal, and transmitting the service security data, so that the home network system and the user terminal can communicate with each other through a second network separated from the first network; and the user terminal connected to the home network system through the second network system, for receiving the service security data, and displaying the service security data to the user.

According to yet another aspect of the invention, a home master device of a home network system includes: a first network interface for receiving security information from at least one security device through a first network based on a predetermined protocol; a second network interface for transmitting a service security data to a user terminal through a second network separated from the first network; and a control means including a security information processing module for generating the service security data having the security information, and enabling the second network interface to transmit the service security data to the user terminal.

Preferably, the security information includes at least one of status information for the security device and image information generated by the security device.

Preferably, the home master device further includes a storage means for storing set information for the security device, so that the security information processing module can make the service security data additionally have the set information.

Preferably, the set information includes a name and installation position of the security device.

Preferably, the storage means stores a control command for the security device, so that the security information processing module can make the service security data additionally have the control command.

Preferably, the control means further includes a control command processing module for receiving a service control data having a control command from the user terminal, reading the control command from the service control data, and enabling the first network interface to transmit the control command to the security device corresponding to the control command.

Preferably, the control command includes an operation and an examination time and/or interval of the security device.

According to yet another aspect of the invention, a security confirmation method includes the steps of: generating, at a security device, security information, and transmitting the security information to a home master device through a first network; generating, at the home master device, a service security data having the security information, and transmitting the service security data to a user terminal through a second network; and displaying, at the user terminal, the service security data.

Preferably, the security information includes at least one of status information for the security device and image information generated by the security device.

Preferably, the display step includes a step for displaying the service security data in the form of a service table which the user can input the control command for the security device into.

Preferably, the security confirmation method includes the steps of: generating, at the user terminal, a service control data having a control command inputted into the service table by the user, and transmitting the service control data to the home master device through the second network; reading, at the home master device, the control command from the service control data; and transmitting, at the home master device, the control command to the corresponding security device through the first network.

Preferably, the control command includes an operation and an examination time and/or interval of the security device.

BRIEF DESCRIPTION OF THE DRAWINGS

The present invention will become better understood with reference to the accompanying drawings which are given only by way of illustration and thus are not limitative of the present invention, wherein:

FIG. 5 is a table showing one example of a service table displayed on a user terminal.

BEST MODE FOR CARRYING OUT THE INVENTION

The present invention will now be described in more detail on the basis of preferred embodiments. However, it is recognized that the scope of the present invention should not be limited to these preferred embodiments but to the claims as hereinafter recited.

Figure 1:
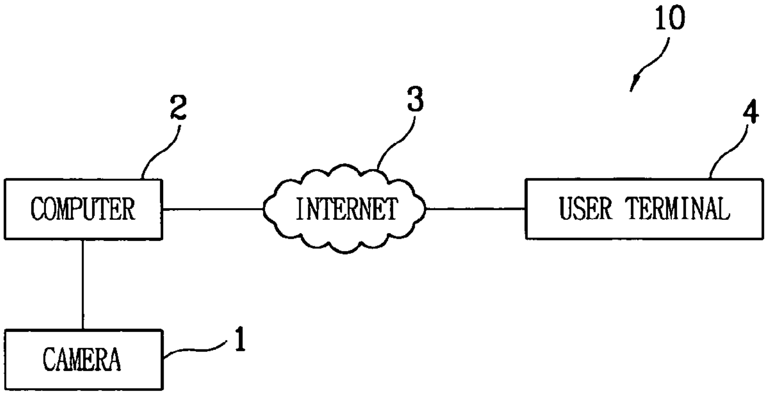
FIG. 1 is a block diagram illustrating a conventional security confirmation system.
Figure 2:
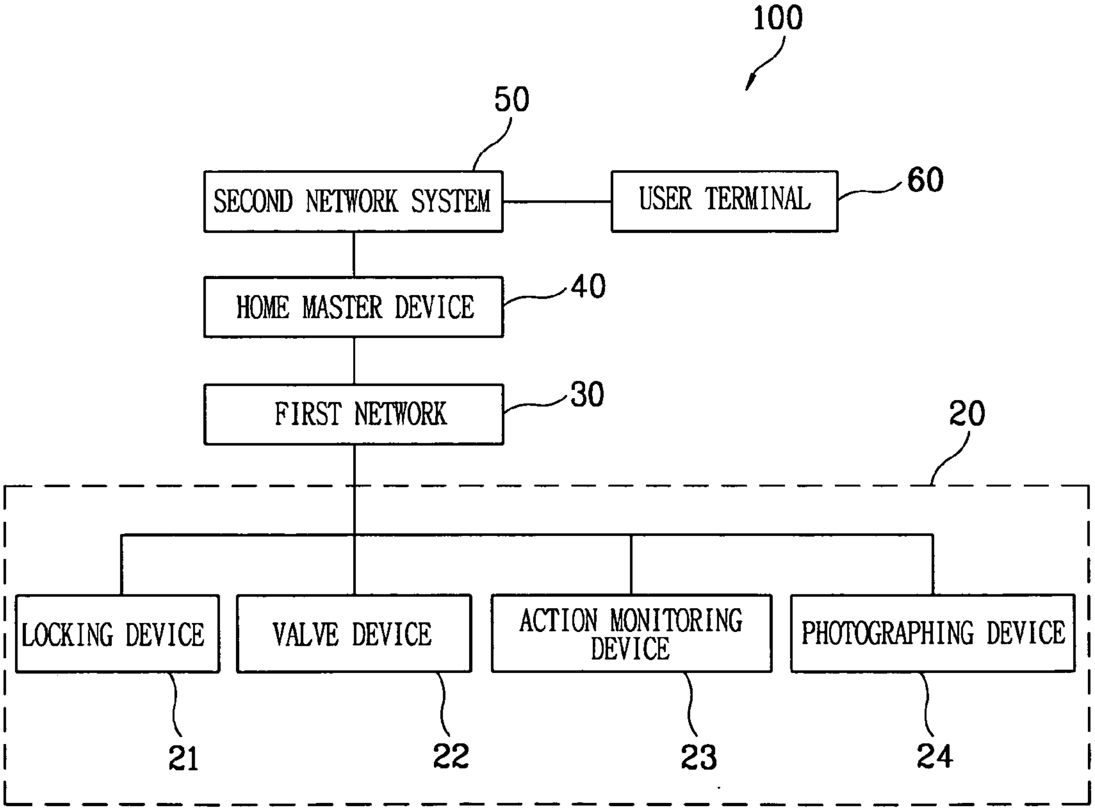
FIG. 2 is a block diagram illustrating a security confirmation system in accordance with the present invention.

FIG. 2 is a block diagram illustrating a security confirmation system in accordance with the present invention. As illustrated in FIG. 2, the security confirmation system 100 includes at least one security device 20 for generating predetermined security information, a first network 30 formed on the basis of a predetermined protocol, for connecting the security device 20 to a home master device 40, the home master device 40 for receiving the security information from the security device 20, generating a service security data having the security information, and transmitting the service security data, a second network system 50 including a predetermined server corresponding to a kind of a user terminal 60, and transmitting the service security data, so that the home master device 40 and the user terminal 60 can communicate with each other through a second network separated from the first network 30 and based on a predetermined protocol, and the user terminal 60 for receiving the service security data, and displaying the service security data to the user.

The user terminal 60 generates a service control data having a control command inputted by the user, and transmits the service control data to the home master device 40 through the second network system 50, and the home master device 40 reads the control command from the service control data, and transmits the control command to the corresponding security device 20 through the first network 30 to control the device 20.

In detail, the security device 20 includes, for example, a locking device 21 such as an automatic door lock, a valve device 22 such as a gas valve and a water valve, an action monitoring device 23 for monitoring actions of objects, animals and human beings in a specific space of a house and/or building, and a photographing device 24 for obtaining images in the house and/or building, which are connected to the first network 30.

The locking device 21 transmits current status information of the automatic door lock, such as open/close or defect to the home master device 40, receives a predetermined control command (for example, close command, open command, etc.) from the home master device 40 through the first network 30, and performs the control command. In the same manner, the valve device 22, the action monitoring device 23 and the photographing device 24 transmit status information and/or image information to the home master device 40 according to their characteristics, receive predetermined control commands (for example, valve close and open commands, action monitoring start and end commands, image photographing start and end commands, etc.) from the home master device 40 through the first network 30, and perform the control commands, respectively. Especially, the photographing device 24 includes a predetermined mobile means, and thus is movable to a predetermined space of the house and/or building. Accordingly, the photographing device 24 is moved to a predetermined space according to a moving command from the user and/or the home master device 40, for generating and providing an image data.

In addition, the first network 30 can be a wire medium such as a specially-installed line, or a power line or telephone line previously installed in each house and/or building, or a wireless transmission medium. However, still referring to FIG. 2, the home master device 40 composes a closed network (separated from the second network) for connecting the security device 20 of each house and/or building through the wire or wireless transmission medium. At this time, the closed network includes physically-connected but logically-divided networks.

The home master device 40 generates a service security data having the security information from the security device 20, namely status information and/or image information of the security device 20. The service security data includes a name (or ID code) of the security device 20 corresponding to the security information, and an installation position of the security device 20 in the house and/or building. In addition, the service security data includes status information in the form of texts, and image information in the form of texts for displaying existence of the image information. The text form for the image information is formed to receive an 'image view' command from the user terminal 60. Here, the service security data includes a previous control command for the security device 20, namely a control command which is being performed or has been performed. The home master device 40 receives a service control data from the user terminal 60, reads a control command from the service control data, and transmits the control command to the security device 20 corresponding to the control command. The structure of the home master device 40 will later be described.

The security device 20, the first network 30 and the home master device 40 are installed in the house and/or building, which are generally designated as a home network system.

The second network system 50 uses a second network (not shown) separated from the first network 30. For example, the second network includes an internet, and additionally includes other constitutional elements according to a kind of the user terminal 60. That is, when the user terminal 60 is a computer, the second network system 50 includes a Web server (not shown) between the second network and the user terminal 60, and when the user terminal 60 is an internet phone, the second network system 50 includes a Wap server (not shown) between the second network and the user terminal 60.

Thereafter, the user terminal 60 receives a service security data through the second network system 50, displays the service security data to the user, receives a control command for the security device 20 from the user, generates a service control data, and transmits the service control data to the home master device 40. Here, the user terminal 60 displays the service security data as a service table which the user can input a predetermined control command into. The service table includes a name (or ID code) and installation position of the security device 20, status information and/or image information, and a preset control command for the security device 20, which are included in the service security data. The control command has an operation and an examination time and/or interval of the security device 20. The examination time and/or interval implies status examination of the security device 20, and the status information implies the examination result.

Figure 3:
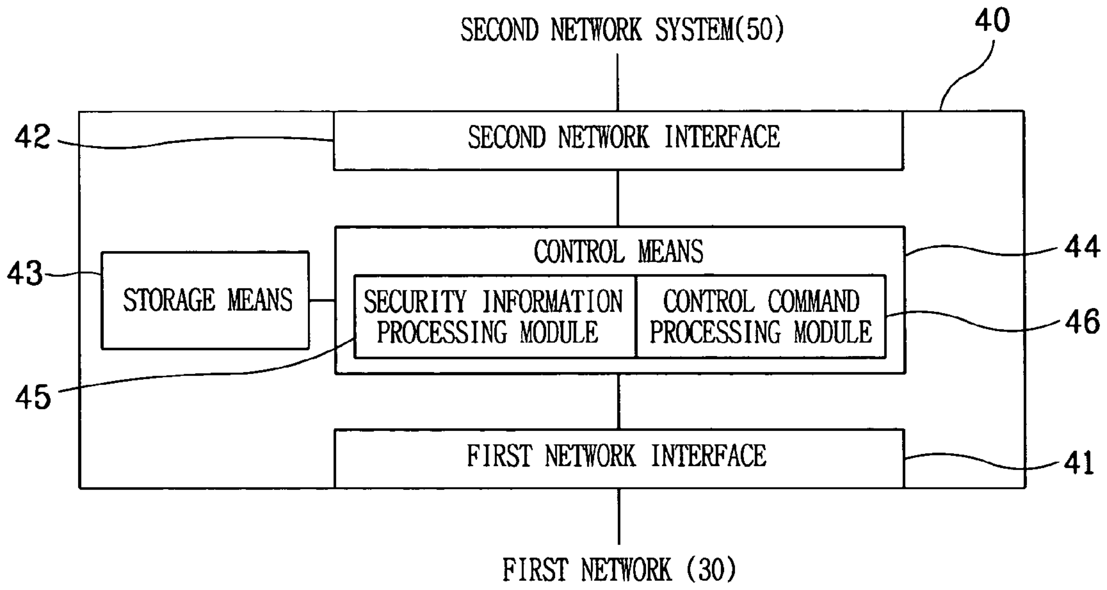
FIG. 3 is a block diagram illustrating a home master device of FIG. 2.

FIG. 3 is a block diagram illustrating the home master device of FIG. 2. As depicted in FIG. 3, the home master device 40 includes a first network interface 41 for receiving security information from the security device 20 through the first network 30, and transmitting a control command to the security device 20, a second network interface 42 for transmitting a service security data to the user terminal 60 through the second network system 50, and receiving a service control data from the user terminal 60, a storage means 43 for storing set information for the security device 20, and a control means 44 for generating the service security data having the security information, and reading the control command from the service control data.

In detail, the storage means 43 stores the set information for the security device 20, and the set information includes a name (or ID code) and installation position of the security device 20. The storage means 43 can additionally include the control command for the security device 20.

The control means 44 includes a security information processing module 45 for generating the service security data having the security information, and enabling the second network interface 42 to transmit the service security data to the user terminal 60, and a control command processing module 46 for reading the control command from the service control data from the user terminal 60, and enabling the first network interface 41 to transmit the control command to the security device 20 corresponding to the control command.

The security information processing module 45 adds set information and/or preset control command stored in the storage means 43 to the service security data with the security information.

Figure 4:
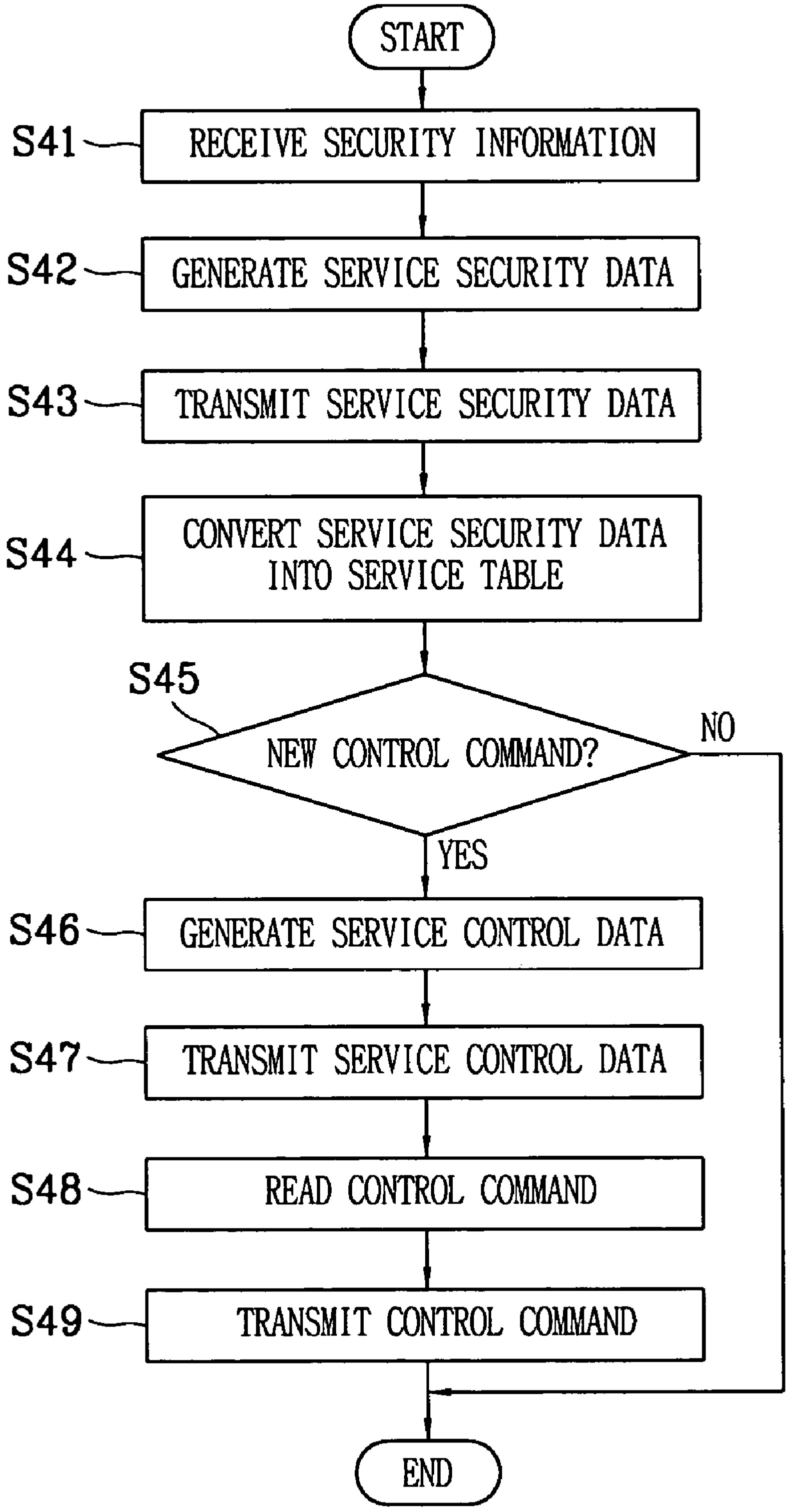
FIG. 4 i s a flowchart showing sequential steps of a security confirmation method in accordance with the present invention.

FIG. 4 is a flowchart showing sequential steps of a security confirmation method in accordance with the present invention.

In detail, in S41, the home master device 40 receives security information from the security device 20 through the first network 30.

In S42, the home master device 40 generates a service security data having the security information. In S43, the home master device 40 transmits the service security data to the user terminal 60 through the second network system 50.

In S44, the user terminal 60 converts the service security data into a service table, and displays the service table to the user.

In S45, when receiving a new control command from the user, the user terminal 60 goes to S46. Otherwise, the user terminal 60 ends the routine.

In S46, the user terminal 60 generates a service control data having the new control command. In S47, the user terminal 60 transmits the service control data to the home master device 40 through the second network system 50.

In S48, the home master device 40 reads the control command from the service control data. In S49, the home master device 40 transmits the control command to the corresponding security device 20, and the security device 20 performs the control command and ends the routine.

FIG. 5 is a table showing one example of the service table displayed on the user terminal.

As shown in FIG. 5, the service table includes a name, installation position, status information and/or image information, operation, and examination time and/or interval of the security device 20.

In the security information, the status information is displayed in the form of texts, and the image information is displayed when the user clicks an image view button.

The operation implies the control command which is being performed or has been performed during the examination by the security device 20. When the user intends to input a new control command, the user clicks a change button.

In addition, the examination time implies an examination time for the status of the security device 20, and the examination interval implies an examination interval within the examination time. If the time and interval are not designated, the examination is performed for a predetermined time at a predetermined interval. The examined status is transmitted to the home master device 40 by the security device 20 in the form of status information and/or image information. As described above, the control command includes the operation and the examination time and/or interval of the security device 20, and the security device 20 receiving the control command performs the operation according to the control command, and transmits the examined status to the home master device 40.

As discussed earlier, in accordance with the present invention, the security confirmation system and the method thereof allow the user to easily confirm the security status, by supplying the service security data including the images in the house and/or building as well as the security status texts of the security devices.

Moreover, the security confirmation system and the method thereof allow the user to easily control the security devices by inputting the control command to the previously-transmitted service security data.

In addition, the security confirmation system and the method thereof can reduce the amount and cost of transmitted data, by basically using the service security data based on texts and additionally using the image data.

Furthermore, the security confirmation system and the method thereof can obtain the image data in a few spaces of the house and/or building by using the mobile security devices.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A network device to achieve efficient communication by optimizing an amount of transmitted data, comprising:

a first network interface for receiving data from a photographing device through a first network based on a predetermined protocol, wherein the data of the photographing device is either status information in the form of text or image information;

a second network interface for receiving service control data from a user terminal and transmitting service security data to the user terminal through a second network separated from the first network; and a controller for:

generating the service security data that includes the:

image information, if the service control data includes a user selectable image view command, or status information in the form of text, if the service control data does not include the user selectable image view command, and a name of the photographing device; and enabling the second network interface to transmit the service security data to the user terminal.

2. The network device of claim 1, wherein the first network interface is also for receiving security information from at least one security device.

3. The device of claim 2, further comprising storage to store set information for the security device, so that the security information processing module can make the service security data additionally have the set information.

4. The device of claim 3, wherein the set information further comprises an installation position of the security device.

5. The device of either claim 1 or 3, wherein the storage stores a control command for the security device, so that the security information processing module is enabled to include the control command in the service security data.

6. The device of claim 1, wherein the controller further comprises a control command processing module for receiving a service control data having a control command from the user terminal, reading the control command from the service control data, and enabling the first network interface to transmit the control command to the security device corresponding to the control command.

7. The device of claim 6, wherein the control command comprises an operation and an examination time and/or interval of the security device.

8. A security confirmation method, comprising:

receiving security information from a photographing device through a first network, wherein the security information of the photographing device is either status information in the form of text or image information;

generating service security data that includes the:

image information, if a received service control data includes a user selectable image view command, or status information in the form of text, if the received service control data does not include the user selectable image view command, and a name of the photographing device;

enabling a second network interface to transmit the service security data; and transmitting the service security data to a user terminal through the second network.

9. The method of claim 8, further comprising receiving security information from at least one security device.

10. The method of claim 8, further comprising:

receiving security information from at least one security device on the first network;

receiving a service control data having a control command addressed to the at least one security device through the second network;

reading the control command from the service control data; and transmitting the control command to the at least one security device through the first network.

11. The method of claim 10, wherein the control command comprises an operation and an examination time and/or interval of the security device.

* * * * *